United States Patent
Hikosaka et al.

(10) Patent No.: US 6,754,020 B1
(45) Date of Patent: Jun. 22, 2004

(54) MAGNETIC RECORDING MEDIA AND MAGNETIC RECORDING/REPRODUCTION APPARATUSES

(75) Inventors: Takashi Hikosaka, Tokyo (JP); Futoshi Nakamura, Yamato (JP); Hideo Ogiwara, Chigasaki (JP); Soichi Oikawa, Kawasaki (JP)

(73) Assignee: Kabushiki Kaisha Toshiba (JP)

( * ) Notice: Subject to any disclaimer, the term of this patent is extended or adjusted under 35 U.S.C. 154(b) by 0 days.

(21) Appl. No.: 09/536,183

(22) Filed: Mar. 27, 2000

(30) Foreign Application Priority Data

Sep. 2, 1999 (JP) .......................................... 11-248858

(51) Int. Cl.[7] ................................................. G11B 5/02
(52) U.S. Cl. ....................... 360/59; 360/324; 360/97.01
(58) Field of Search ....................... 360/324, 59, 97.01; 369/13.01

(56) References Cited

U.S. PATENT DOCUMENTS

| | | | | |
|---|---|---|---|---|
| 3,883,892 A | * | 5/1975 | Kneller et al. ................. | 360/59 |
| 5,766,718 A | * | 6/1998 | Matsuda et al. ........... | 428/65.3 |
| 5,889,740 A | | 3/1999 | Nakayama et al. ............ | 369/13 |
| 5,986,977 A | * | 11/1999 | Birukawa et al. ........ | 369/13.06 |
| 6,016,241 A | * | 1/2000 | Coffey et al. ................ | 360/324 |
| 6,180,268 B1 | * | 1/2001 | Tamanoi et al. ......... | 369/13.38 |
| 6,327,227 B1 | * | 12/2001 | Katayama ................. | 369/13.17 |
| 6,493,164 B1 | * | 12/2002 | Kikitsu et al. ................. | 360/59 |
| 2002/0122278 A1 | * | 9/2002 | Shimazawa et al. ... | 360/324.11 |

FOREIGN PATENT DOCUMENTS

| | | | | | |
|---|---|---|---|---|---|
| JP | 62184644 A | * | 8/1987 | ........... | G11B/11/10 |
| JP | 10289434 A | * | 10/1998 | ............ | G11B/5/66 |
| JP | 10-320740 | | 12/1998 | ............ | G11B/5/66 |

OTHER PUBLICATIONS

IBM Technical Disclosure Bulletin, Magnetic Memory Device Utilizing Coupled Film, Jul. 1967, IBM, vol. 10 Issue 2, pp. 144–145.*

* cited by examiner

Primary Examiner—David Hudspeth
Assistant Examiner—Rocio Colon
(74) Attorney, Agent, or Firm—Gray Cary Ware & Freidenrich LLP

(57) ABSTRACT

Magnetic recording media with thermal fluctuation resistance and low noise made compatible are obtained by using as magnetic layers a combination of a first magnetic material having a first Curie point higher than the recording temperature and a second magnetic material having a second Curie point higher than the operation temperature of the apparatus and lower than the recording temperature, a combination of a ferromagnetic material having a Curie point higher than the recording temperature and an antiferromagnetic material having a Neel point higher than the operation temperature of the apparatus and lower than the recording temperature.

24 Claims, 3 Drawing Sheets

MAGNETIC RECORDING MEDIA AND MAGNETIC RECORDING/REPRODUCTION APPARATUSES

CROSS-REFERENCE TO RELATED APPLICATIONS

This application is based upon and claims the benefit of priority from the prior Japanese Patent Application No. 11-248858, filed Sep. 2, 1999, the entire contents of which are incorporated herein by reference.

BACKGROUND OF THE INVENTION

The present invention relates to a magnetic recording/reproduction apparatus for recording information with magnetism and magnetic recording media used for the same, especially a magnetic recording apparatus wherein heat is applied when recording and magnetic recording media used for the same.

Research heretofore has shown that when attempting to improve recording density of magnetic recording, it is difficult to make reduction of media noise and improvement of resistance to thermal fluctuation compatible.

Use of materials with elevated magnetic anisotropy energy of magnetic film of the media may be considered as one of the solutions. However, when a material with increased anisotropy field is used in order to raise magnetic anisotropy energy of the magnetic layer, a problem of difficulty of recording has occurred because there is a limit in magnetic field of a magnetic recording head.

In recent years heat assisted recording has been proposed as one of the methods to solve such a problem. Heat assisted recording is a technology with which to stabilize thermal fluctuation by heating the recording region of the medium during recording to reduce anisotropy field Hk of the magnetic film, and thus, facilitating recording, and by raising anisotropy field through recovering the temperature after recording.

A graph representing the relations of temperature with anisotropy field and activation magnetic moment is shown in FIG. 1.

In the figure, graph 901 represents the relation between temperature and anisotropy field, and graph 902 represents the relation between temperature and activation magnetic moment.

As shown in graph 901, anisotropy field lowers as temperature rises.

However, when a conventional magnetic layer was used, as shown in graph 902, activation magnetic moment visb rises. Activation magnetic moment is known that relates to noise, if the value of the activation magnetic moment is larger, the value of noise is also larger. On the other hand, with smaller activation magnetic moment value due to smaller magnetic particles, while noise can be reduced, there was a problem of reduction in thermal fluctuation resistance at the operating temperature of the magnetic recording/reproduction apparatus.

BRIEF SUMMARY OF THE INVENTION

The purpose of the present invention is to solve the problems described above, and to provide magnetic recording media with good thermal fluctuation resistance and little noise.

Another purpose of the present invention is to provide a magnetic recording/reproduction apparatus capable of magnetic recording and reproduction with good thermal fluctuation resistance and little noise.

The present invention first provides a magnetic recording medium applied to a magnetic recording/reproduction apparatus that carries out recording while heating the recording region to a determined temperature higher than the operation temperature of the magnetic recording/reproduction apparatus, comprising, a substrate, and a magnetic layer essentially consisting of a first magnetic material having a first Curie point higher than the recording temperature, and a second magnetic material having a second Curie point higher than the operation temperature and lower than the recording temperature.

The present invention secondly provides a magnetic recording medium applied to a magnetic recording/reproduction apparatus that carries out recording while heating the recording region to a determined temperature higher than the operation temperature of the magnetic recording/reproduction apparatus, wherein a substrate, and a magnetic layer essentially consisting of a ferromagnetic material having a Curie point higher than the recording temperature, and an antiferromagnetic material having a Neel temperature lower than the recording temperature.

The present invention thirdly provides a magnetic recording/reproduction apparatus comprising a magnetic recording medium, a driving means for holding and rotating the magnetic recording medium, a magnetic head device for recording information onto the magnetic recording medium, a device for reproducing the recorded magnetic information, a recording region heating means for heating the recording region of the magnetic recording medium to a determined recording temperature, and a carriage assembly for holding the magnetic recording head against the magnetic recording medium with freedom of movement, wherein the magnetic recording medium having a substrate and a magnetic layer provided on the substrate and essentially consisting of a first magnetic material with the first Curie point lower than the recording temperature and a second magnetic material with the second Curie point higher than the recording temperature.

The present invention fourthly provides a magnetic recording apparatus, which is a magnetic recording/reproduction apparatus equipped with a magnetic recording medium, a driving means for holding and rotating the magnetic recording medium, a magnetic head device for recording information onto the magnetic recording medium, a device for reproducing the recorded magnetic information, a recording region heating means for heating the recording region of the magnetic recording medium to a determined recording temperature, and a carriage assembly for holding the magnetic recording head against the magnetic recording medium with freedom of movement, wherein the magnetic recording medium having a substrate and a magnetic layer provided on the substrate and essentially consisting of a ferromagnetic material with a Curie point higher than the recording temperature and an antiferromagnetic material with a Neel temperature lower than the recording temperature.

By using the present invention, magnetic recording with good thermal fluctuation resistance and little noise can be realized.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
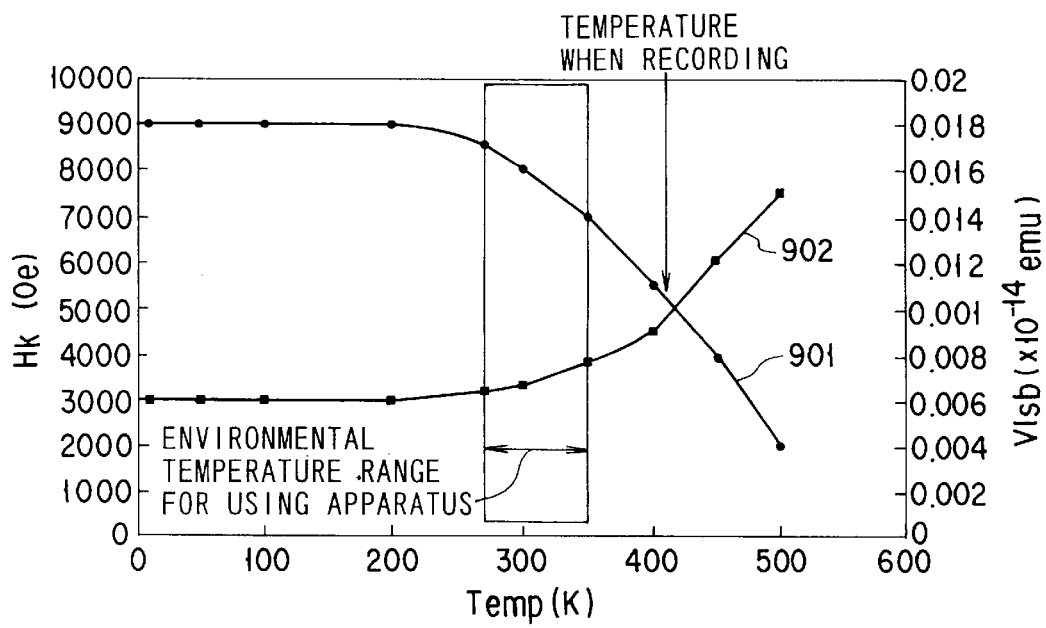
FIG. 1 is a graph representing relations of temperature to anisotropic field and activation magnetic moment of a conventional magnetic recording material.

The present invention can be categorized into following four aspects.

A magnetic recording medium relating to the first aspect of the present invention has a substrate and a magnetic layer, and is adapted to a magnetic recording/reproduction apparatus that carries out recording while heating the recording region during recording to a determined temperature higher than the operation temperature of the magnetic recording/reproduction apparatus, wherein the magnetic layer is essentially consisted of a first magnetic material having a first Curie point higher than the recording temperature, and a second magnetic material having a second Curie point higher than the operation temperature and lower than the recording temperature.

A magnetic recording medium relating to the second aspect of the present invention has a substrate and a magnetic layer, and is adapted to a magnetic recording/reproduction apparatus that carries out recording while heating the recording region during recording to a determined temperature higher than the operation temperature of the magnetic recording/reproduction apparatus, wherein the magnetic layer is essentially consisted of a ferromagnetic material having a Curie point higher than the recording temperature, and an antiferromagnetic material having a Neel temperature higher than the operation temperature and lower than the recording temperature.

A magnetic recording/reproduction apparatus relating to the third aspect of the present invention is an apparatus to which the magnetic recording medium relating to the first aspect is applied, and is equipped with this magnetic recording medium, a driving means for holding and rotating said magnetic recording medium, a magnetic head device for recording information onto said magnetic recording medium, a device for reproducing the recorded magnetic information, a recording region heating means for heating the recording region of said magnetic recording medium to a determined recording temperature, and a carriage assembly for holding the magnetic recording head against said magnetic recording medium with freedom of movement.

Further a magnetic recording/reproduction apparatus relating to the fourth aspect of the present invention is an apparatus to which the magnetic recording medium relating to the second aspect is applied, and is equipped with this magnetic recording medium, a driving means for holding and rotating said magnetic recording medium, a magnetic head device for recording information onto said magnetic recording medium, a device for reproducing the recorded magnetic information, a recording region heating means for heating the recording region of said magnetic recording medium to a determined recording temperature, and a carriage assembly for holding the magnetic recording head against said magnetic recording medium with freedom of movement.

According to the present invention, high Ku materials are used for the magnetic layer, and the recording region is heated to carry out heat assisted recording. By this, when heated the anisotropic field of the magnetic layer is lowered, its anisotropy energy is lowered, and recording can be made easier. On the other hand, by recovering the temperature after recording, anisotropic energy can be raised and thermal fluctuation resistance can be made favorable.

Further, according to the present invention, increase in the activation magnetic moment due to heating can be lowered during recording by using a combination of a first magnetic material having a first Curie point higher than the recording temperature and a second magnetic material having a second Curie point higher than the operation temperature of the apparatus and lower than said recording temperature, or a combination of a ferromagnetic material having a Curie point higher than the recording temperature and an antiferromagnetic material having a Neel temperature higher than the operation temperature of the apparatus and lower than the recording temperature.

Figure 2:
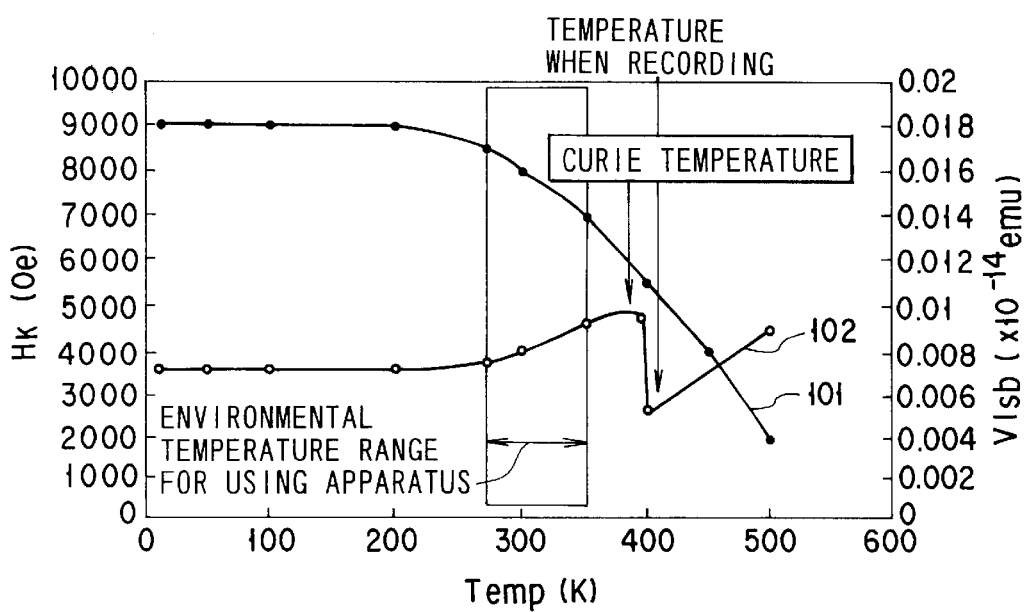
FIG. 2 is a graph representing relations of temperature to anisotropic field and activation magnetic moment of a magnetic recording material of the present invention.

FIG. 2 shows a graph representing relation of temperature with the anisotropy field and the activation of magnet element of a magnetic recording medium related to the first aspect described above.

In the figure, graph 101 represents the relation between temperature and the anisotropy field, and graph 102 represents the relation between temperature and the activation magnetic moment.

Graph 101 shows that anisotropy field lowers as temperature rises. Furthermore, as shown in graph 102, the magnetic recording medium of the present invention shows a behavior of the activation magnetic moment vIsb of the magnetic layer that lowers remarkably at the Curie point above the operation temperature and rises again later. This means that by using the magnetic recording medium of the present invention, when temperature is raised to the recording temperature, interaction among magnetic particles can be lowered. Also, during ordinary data holding, interaction among magnetic particles can be intensified as temperature lowers. Thus, by combining a magnetic particulate material with high anisotropy constant Ku and a grain boundary material exhibiting a specific value due to the use environment of the apparatus, and by adjusting the recording temperature higher than the Curie point of the grain boundary, interaction among particles can be minimized during recording and can be intensified in the typical use range of the apparatus, so that noise can be minimized.

Also, an equal effect is obtained when a magnetic recording medium relating to the second aspect of the present invention is used, as a similar behavior of the activation magnetic moment vIsb of the magnetic layer remarkably lowering at the Neel temperature of an antiferromagnetic material above the operation temperature of the apparatus and rising again later can be seen.

Thus, according to the present invention, thermal fluctuation resistance can be maintained by means of a high Ku material and a heat assisted magnetic recording system, and medium noise can be prevented from increasing, and thermal fluctuation resistance and noise reduction can be made compatible, by using an improved magnetic layer.

The magnetic layer may have any structure such as laminated structure, intergranular separation structure, and granular structure, as far as it utilizes a combination of a first magnetic material with a first Curie point higher than the recording temperature and a second magnetic material with a second Curie point higher than the operation temperature of the apparatus and lower than the recording temperature, or a combination of a ferromagnetic material with a Curie point higher than the recording temperature and an antiferromagnetic material with a Neel temperature higher than the operation temperature of the apparatus and lower than the recording temperature. Furthermore, they may be combined.

As an example of preferable structure of magnetic layer of the medium related to the first and the third aspects, a structure having the first magnetic layer substantially comprising the first magnetic material and the second magnetic layer substantially comprising the second magnetic material laminated one by one on a substrate may be cited.

Moreover, the third magnetic layer substantially comprising the first magnetic material may be further provided over the second magnetic layer.

Also, a laminate structure with still more layers may be formed by providing plurality of combinations of a magnetic layer substantially comprising the first magnetic material and a magnetic layer substantially comprising the second magnetic material.

As another example of a preferred structure of magnetic layers, a structure having particles of magnetic material substantially comprising the first magnetic material dotted in a matrix of a magnetic material substantially comprising the second magnetic material may be cited.

As still another example of a preferred structure of the magnetic layer, a structure wherein particles of magnetic material substantially comprises the first magnetic material forms prisms, and a magnetic body substantially comprises the second magnetic material forms grain boundaries of the prisms may be cited.

Further, as a preferred structure of the magnetic layer of the medium related to the second and the fourth aspects, said preferred structure of the magnetic layer of the medium related to the second and the fourth aspects wherein a ferromagnetic material with a Curie point higher than the recording temperature is used instead of the first magnetic material, and an antiferromagnetic material with a Neel temperature higher than the operation temperature of the apparatus and lower than the recording temperature is used instead of the second magnetic material may be cited.

As the first magnetic material with a Curie point higher than the recording temperature, alloys such as CoPt alloys, CoCr alloys, CoPtCr alloys, CoPtO alloys, FePt alloys may be used.

As the second magnetic material with a second Curie point higher than the operation temperature of the apparatus and lower than the recording temperature, alloys such as FeCr alloys, CoCr alloys, NiCr alloys, FeAl alloys, FeSi alloys, FeCu alloys, FeMn alloys, NiV alloys, NiSi alloys, NiAl alloys, NiCu alloys, NiRh alloys, NiIr alloys, NiRu alloys, NiW alloys, NiMo alloys, CoMn alloys, CoMnFe alloys, and CoMnNi alloys may be used.

As a ferromagnetic material with a Curie point higher than the recording temperature, alloys such as CoPt alloys, CoCr alloys, CoPtCr alloys, CoPtO alloys, and FePt alloys may be used.

As an antiferromagnetic material with a Neel temperature higher than the operation temperature of the apparatus and lower than the recording temperature, AuMn, NiO, FeMn, $NiMn_3$, $IrMn_9$, and $PtMn_3$ may be used.

As an undercoat layer, vanadium or chromium may be used.

The present invention is described below in detail with reference to drawings.

Figure 3:
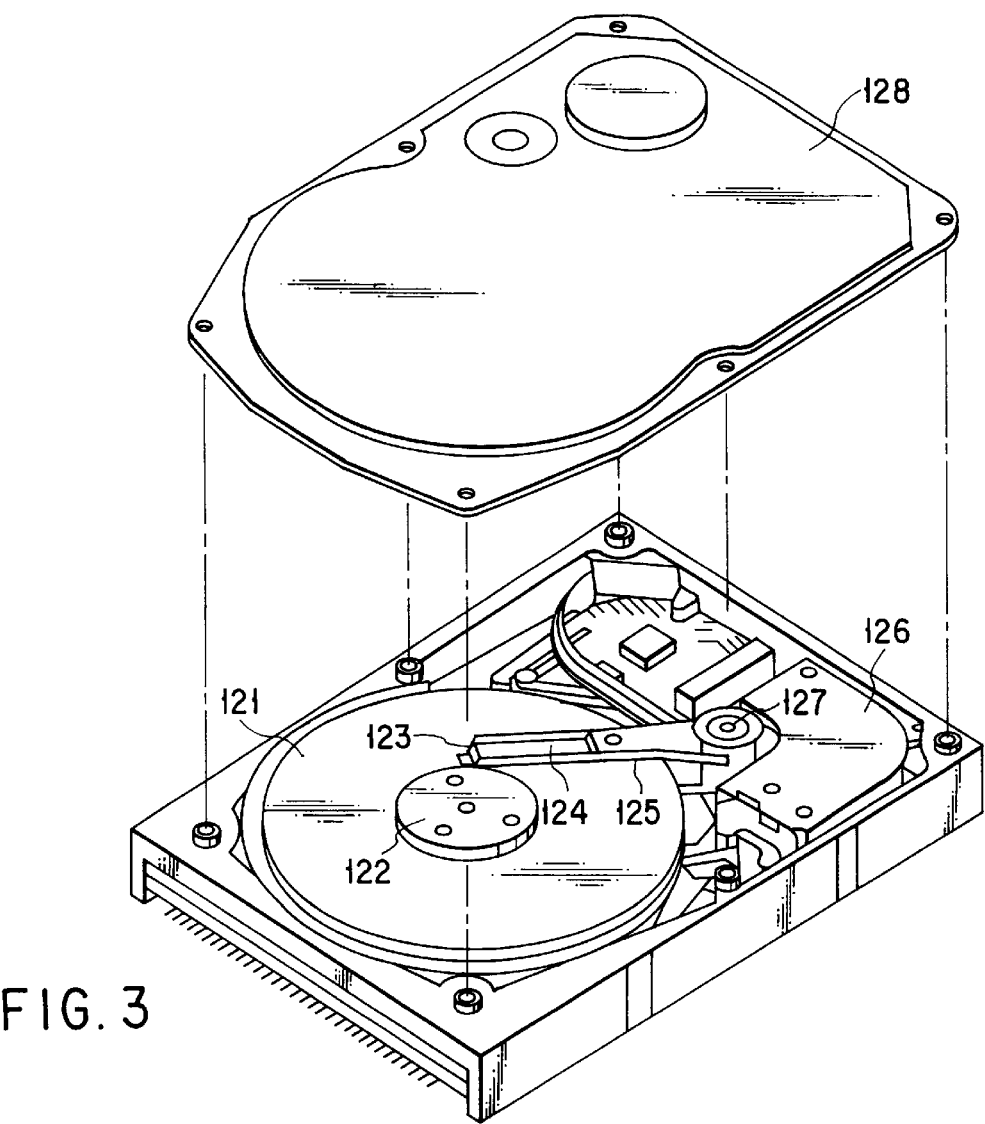
FIG. 3 is a perspective view of partially disassembled example of a magnetic recording/reproduction apparatus relating to the present invention.

An example of the magnetic recording/reproduction apparatus related to the present invention is shown as a partially disassembled perspective view in FIG. 3.

A rigidly constructed magnetic disc 121 for recording information is mounted on a spindle 122 and rotated at a constant rotational speed by means of an unshown spindle motor. A slider 123, whereupon a magnetic head for recording and reproducing information by accessing the magnetic disc 121 is mounted, is fixed at the tip of a suspension 124 comprised of flat springs in the form of thin plates. The suspension 124 is connected to an end of an arm 125 having a bobbin for holding an unshown driving coil, etc.

The other end of the arm 125 is provided with a voice coil motor 126, a kind of linear motor. The voice coil motor 126 is comprised of an unshown driving coil wound up by the bobbin part of the arm 125, and a magnetic circuit formed with a permanent magnet and an opposite yoke facing with each other with the driving coil in between.

The arm 125 is held by unshown ball bearings provided at two positions above and below a fixed rod 127, and rotated and oscillated with the voice coil motor 126. Thus, the position of the slider 123 on the magnetic disc 121 is controlled by the voice coil motor 126. In FIG. 3, 128 indicates a cover.

Figure 4:
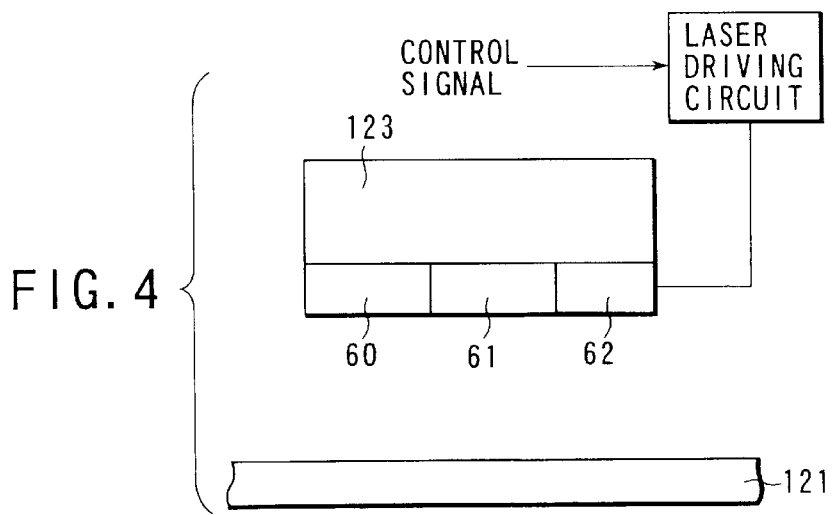
FIG. 4 is a schematic view for explaining a slider used in the present invention.

A schematic view for explaining the slider whereupon the magnetic head used in the magnetic recording/reproduction apparatus of the present invention is mounted is shown in FIG. 4.

As shown in the figure, a reading head 60, writing head 61, and a laser diode 62 to which a laser driving circuit is connected are mounted on this slider. The laser diode 62 is driven by the laser driving circuit operating according to the beam irradiation control signal to heat the recording region by laser beam irradiation.

EXAMPLES

Example 1

Figure 5:
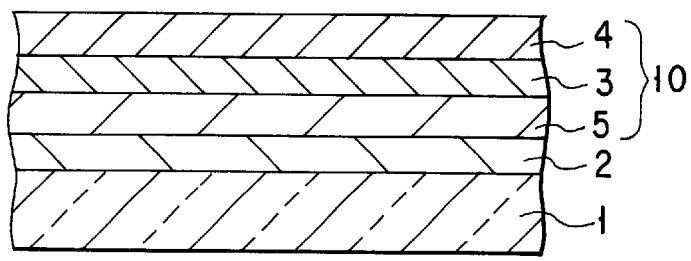
FIG. 5 is a schematic view showing an example of a magnetic recording medium relating to the present invention.

A schematic view showing an example of a magnetic recording medium related to the present invention is shown in FIG. 5.

As shown in the figure, this magnetic recording medium has a structure wherein an undercoat film 2, and a recording layer 10 comprising a magnetic layer 5, a low Curie point magnetic layer 3, and a magnetic layer 4 are laminated one by one on a non-magnetic substrate 1. A protecting layer can be also formed on the recording layer 10.

The recording layer 10 is comprised of two kinds of magnetic materials, one with a Curie point higher than the recording temperature of the apparatus, and the other with a Curie point higher than the operating temperature of the apparatus and lower than the recording temperature.

For example, an undercoat film 2 consisting of a layer of vanadium alloy was formed by the sputtering method at the film thickness of 40 nm on a disc shaped glass substrate 1, and 10 nm thickness of a magnetic layer 5 was formed on it by using a target consisting of a $Co_{64}Pt_{20}Cr_{16}$ alloy. On this a low Curie point magnetic layer 3 consisting of a $Fe_{1-x}Cr_x$ alloy, x is 35 to 75, with a Curie point higher than the operation temperature of the apparatus and in the temperature range of 373 K to 500 K, for example, where the film and the substrate are not irreversibly changed by the laser was formed, and further on this layer, a CoPtCrO magnetic layer 4 having 10 nm thickness was formed by using consisting of a $Co_{64}Pt_{20}Cr_{16}$ alloy with a Curie point about 100 K to 230 K higher than that of the low Curie point magnetic layer 3. This layer may be further coated with unshown protective film and lubricating material.

This is used as the medium, and when information is recorded, at least the region for recording is heated to above the Curie point of the middle layer. At this time the magnetic layers above 4 and below 5 do not couple magnetically, and the magnetization inversion units follow the activation magnetic moment or the Barkhausen volume of each of them. For example, when one low curie point magnetic layer such as $Fe_{35}Cr_{65}$ was measured at 430 K which is above the Curie point 390 K of the $Fe_{35}Cr_{65}$ alloy, a value of $0.06 \times 10^{-14}$ (emu) was obtained as the activation magnetic moment. At this time change in values of coercivity around the temperature of 430 K was −8.8 Oe/deg. When this medium is cooled down to the typical use temperature range of the apparatus, 300 K, properties of FeCr of the low Curie point magnetic layer 3 is changed to affects the CoPtCrO layers above and below to couple magnetically. The activation magnetic moment had increased to $0.073 \times 10^{-14}$ (emu) when measured at this temperature. At this time change is values of coercivity around this temperature was −3.3 Oe/deg. Noise of the medium is generally known to decrease as activation magnetic moment or Barkhausen volume of the magnetic film decreases, and this is considered to be because the clusters of inversion units become smaller when magnetization transition is formed, and is governed by the value at the time of measurement.

On the other hand, while magnetization is being recorded, inversion is considered not to be easy to occur thermally as coupling among magnetic particles has become stronger.

Comparative Example 1

As a comparative example 1, a medium was prepared as in example 1 except for using a $Co_{64}Pt_{20}Cr_{20}$ alloy target having almost the same high Curie point as in example 1 and twice as thick to obtain about the same Mrt instead of the $Co_{64}Pt_{20}Cr_{16}$ alloy target and the low Curie point magnetic layer 3 consisting of $Fe_{35}Cr_{65}$ alloy.

The index value of thermal fluctuation resistance vKu/kT (v stands for particle diameter, Ku stands for anisotropy energy of the magnetic layer, k stands for Boltzmann's constant, and T stands for temperature) of this magnetic film at room temperature was almost the same as in the present invention, and the activation magnetic moment value was $0.073 \times 10^{-14}$ (emu). When measured at 430 K, the activation magnetic moment of this film had increased to $0.12 \times 10^{-14}$ (emu). Therefore, the activation magnetic moment during recording was smaller with example 1.

When recording was carried out with these media while heating with a laser, and reproduction signal was measured by a GMR head to determine So/Nm of the media, the present invention showed the higher value corresponding to the activation magnetic moment during recording. Measurement of output reduction at room temperature showed almost the same results reflecting thermal fluctuation resistance indexes.

Comparative Example 2

As comparative example 2, thermal fluctuation resistance index of a single component medium to have activation magnetic moment during recording of similar $0.06 \times 10^{-14}$ (emu) as in example 1 except for a Cr alloy showing paramagnetism at room temperature being formed instead of the low Curie point magnetic layer 3 consisting of a $Fe_{35}Cr_{65}$ alloy was compared, and the value was found to be 65, about half that of the medium of the present invention.

When recording was carried out with these media while heating with a laser, and reproduction signal was measured by a GMR head to determine So/Nm of the media, the results were almost the same, but measurement of output reduction at room temperature showed more reduction with comparative examples 1 and 2 reflecting thermal fluctuation resistance indexes.

Furthermore, though a in-plane recording magnetic layer is used as the recording apparatus in the example, Pt, Pd, Ru or their alloys may be used instead of V or Cr alloy for vertical recording.

Example 2

Figure 6:
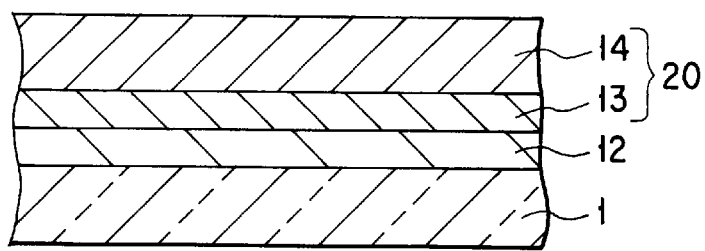
FIG. 6 is a schematic view showing another example of a magnetic recording medium relating to the present invention.

A schematic view showing another example of a magnetic recording medium related to the present invention is shown in FIG. 6.

As shown in the figure, this magnetic recording medium has a structure wherein an undercoat film 12, and a recording layer 20 comprising a low Curie point magnetic layer 13 and a magnetic layer 14 are laminated one by one on a non-magnetic substance 1.

The recording layer 20 is comprised of two kinds of magnetic materials, one with a Curie point higher than the recording temperature of the apparatus, and the other with a Curie point higher than the operating temperature of the apparatus and lower than the recording temperature.

This medium was obtained by forming a film of an undercoat film 12 consisting of a vanadium alloy on a disc shaped glass substrate 1, a low Curie point magnetic layer 13 having 3 to 5 nm thickness, consisting of a $Fe_{100-x}Cr_x$ alloy, x=35 to 75, with a Curie point higher than the operation temperature of the apparatus and in the temperature range of 373 K to 500 K, for example, where the film and the substrate are not irreversibly changed by the laser was formed on this film, and a magnetic layer 14 of for example a CoPtCrO alloy was further formed on the film by using $Co_{64}Pt_{20}Cr_{16}$ alloy as a target. Here, the Curie point of the CoPtCr alloy is to be higher than the FeCr alloy of the low Curie point magnetic layer 13 by 100 K to 230 K. Further on this film a protective film may be formed and a coating of lubricating material may be applied.

This is used as the medium, and when information is recorded, at least the region for recording is heated to above the Curie point of the middle layer 13. At this time the magnetic layers above and below do not couple magnetically, and the magnetization inversion units follow the activation magnetic moment or the Barkhausen volume of each of them. For example, when measured at 390 K which is above the Curie point 420 K of the $Fe_{35}Cr_{65}$ alloy, a value of $0.06\times10^{-14}$ (emu) was obtained as the activation magnetic moment. When this medium is cooled down to the typical use temperature range of the apparatus, 300 K, under the influence of the $Fe_{35}Cr_{65}$ of the low Curie point magnetic layer 12, the CoPtCr magnetic particles of the recording layer 20 are affected to couple magnetically with each other. The activation magnetic moment has increased to $0.08\times10^{--}$(emu) when measured at this temperature.

Comparative Example 3

As comparative example 3, a medium having a similar construction as in example 2 except for a $Fe_{35}Cr_{65}$ film not formed was formed, and activation magnetic moment was measured at 450 K to be $0.06\times10^{-14}$ (emu). With this film, activation volume was measured at room temperature to be a smaller value of $0.036\times10^{-14}$ (emu). Thus, activation magnetic moment during recording were equal, but thermal fluctuation resistance at room temperature of example 2 was 1.7 times larger. When recording was carried out with these media while heating with a laser, and reproduction signal was measured by a GMR head to determine So/Nm of the media, the medium of example 2 showed the higher value. Furthermore, in the measurement of output reduction at room temperature, the present invention showed less reduction.

Example 3

Figure 7:
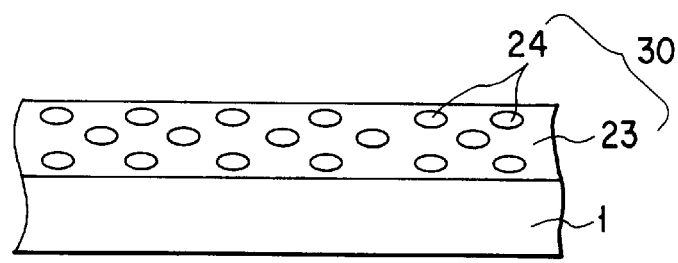
FIG. 7 is a schematic view showing still another example of a magnetic recording medium relating to the present invention.

A schematic view showing still another example of a magnetic recording medium related to the present invention is shown in FIG. 7.

As shown in the figure, this magnetic recording medium has a structure wherein a recording layer 30 having a construction of magnetic particles 24 dotted in a matrix of a low Curie point magnetic layer 23 is formed on a non-magnetic substrate 1.

For example, a granular type magnetic layer comprising a $Co_{80}Pt_{20}$ alloy as the magnetic layer and a $Fe_{100-x}Cr_x$ alloy, x=35 to 75, with a Curie point higher than the operation temperature range of the apparatus and in the temperature range of 373 K to 500 K, for example, where the film and the substrate are not irreversibly changed by the laser, as the matrix was formed by a co-sputtering process on a disc shaped glass substance. Here, the Curie point of the $Co_{80}Pt_{20}$ alloy was sufficiently higher than that of the low Curie point magnetic material FeCr alloy. Further, a protective film may be formed and lubricating material may be applied on the layer.

When the obtained medium is used to record information, at least the recording region is heated above the Curie point of the low Curie point magnetic layer. At this time the dotted magnetic layers do not couple magnetically, and the magnetization inversion units follow the activation magnetic moment or the Barkhausen volume of each of them. When a medium using a magnetic material of a $Co_{80}P_{20}$ alloy was measured at 450 K which is above the Curie point 390 K of the $Fe_{35}Cr_{65}$ alloy, a value of $0.07\times10^{-14}$ (emu) was obtained as the activation magnetic moment. When this medium is cooled down to the typical use temperature range of the apparatus, 300 K, under the influence of FeCr of the low Curie point magnetic material, the dotted CoPt particles are affected to couple magnetically with each other. The activation magnetic moment had increased to $0.14\times10^{-14}$ (emu) when measured at this temperature.

Comparative Example 4

As comparative example 4, a medium obtained by forming a $Co_{80}Pt_{20}$—$SiO_2$ magnetic layer on a substrate using $SiO_2$ as the matrix, without using a low Curie point magnetic material $Fe_{35}Cr_{65}$, was measured at 450 K and an activation volume of $0.07\times10^{-14}$ (emu) was obtained. The activation volume of this magnetic layer measured at room temperature was smaller, $0.065\times10^{-14}$ (emu). Thus, though the activation magnetic moment during recording is not different between example 3 and comparative example 4, the value was larger with example 3 at the ambient temperature.

When recording was carried out with these media while heating with a laser, and reproduction signal was measured by a GMR head to determine So/Nm of the media, there was not much difference, but measurement of output reduction at room temperature showed smaller reduction with the medium of example 3.

Example 4

Figure 8:
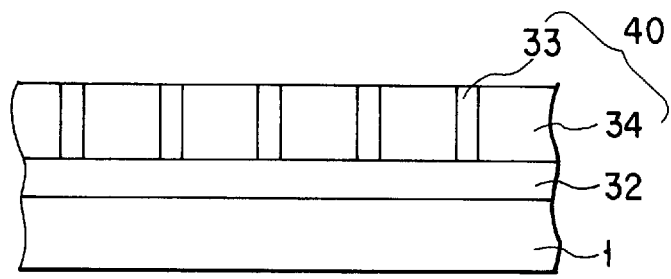
FIG. 8 is a schematic view showing still another example of a magnetic recording medium relating to the present invention.

A schematic view showing still another example of a magnetic recording medium related to the present invention is shown in FIG. 8.

As shown in the figure, this magnetic recording medium has a structure wherein an undercoat film 32 and a recording layer 40 having a structure in which columns 34 of magnetic material are formed with a low Curie point magnetic material as grain boundary 33 are laminated one by one on a non-magnetic substrate 1.

This medium was obtained by forming an undercoat film consisting of a vanadium alloy on a disc shaped glass plate, and forming a $Fe_{35}Cr_{65}$ alloy with a Curie point higher than the operation temperature of the apparatus and in the temperature range of 373 K to 500 K, for example, where the film and the substrate are not irreversibly changed by the laser by co-sputtering with a $Co_{80}Pt_{20}$ alloy as magnetic particles on the film. Here, the Curie point of the $Co_{80}Pt_{20}$ alloy was sufficiently higher than that of the FeCr alloy. Further, a protective film may be formed and a coating of lubricant may be applied on this film. Due to the thickness of the undercoat film 32 and the magnetic film 34, the cross section of the medium shows columner structures with FeCr as grain boundary as shown in FIG. 8.

When this medium is used to record information, at least the recording region is heated to above the Curie point of the grain boundary. At this time the columner magnetic particles do not couple magnetically with each other, and the magnetization inversion units follow their activation magnetic moment or Barkhausen volume. When for example a medium using a $Co_{80}Pt_{20}$ magnetic material was measured at 450 K which is above the Curie point 420 K of the $Fe_{35}Cr_{65}$ alloy, a value of $0.06\times10^{-14}$ (emu) was obtained as the activation magnetic moment. When this medium is cooled down to the typical use temperature range of the apparatus, 300 K, under the influence of intergranular $Fe_{35}Cr_{65}$ of the low Curie point magnetic material, the columner CoPt magnetic particles are affected to couple magnetically with each other. The activation magnetic moment had increased to $0.14 \times 10^{-14}$ (emu) when measured at this temperature.

Comparative Example 5

As comparative example 5, a medium was obtained by forming a $Co_{80}Pt_{20}$ magnetic film having a similar thermal fluctuation index vKu/kT value at room temperature on a substrate and an undercoat film similar to those in example 4, without using a low Curie point material, and the activation magnetic moment was compared at the recording temperature to show that of comparative example 1.5 times larger.

When recording was carried out with these media while heating with a laser, and reproduction signal was measured by a MGR head, output reduction due to thermal fluctuation resistance was almost the same, but So/Nm of the medium of example 4 was better.

Example 5

Figure 9:
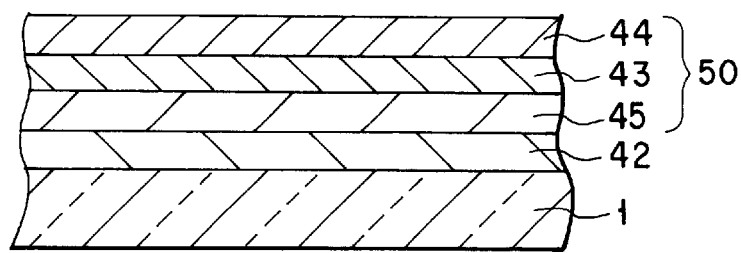
FIG. 9 is a schematic view showing a further example of a magnetic recording medium relating to the present invention.

A schematic view showing still another example of a magnetic recording medium related to the present invention is shown in FIG. 9.

As shown in the figure, this magnetic recording medium has a structure wherein an undercoat film 42 and a recording layer 50 consisting of a ferromagnetic layer 45, an antiferromagnetic layer 43, and a ferromagnetic layer 44 are laminated on a non-magnetic substrate 1.

This medium was obtained by forming an undercoat film consisting of a chromium alloy on a disc shaped glass plate, and forming a magnetic layer 44 on the film by using $Co_{64}Pt_{20}Cr_{16}$ alloy as a target. On this film an antiferromagnetic layer 45 consisting for example of $PtMn_3$ with a Neel temperature higher than the operation range of the apparatus and in the temperature range where the film and the substrate are not irreversibly changed by the laser is formed, and further on this film a magnetic layer 43 is formed by using a $Co_{64}Pt_{20}Cr_{16}$ alloy as a target. Here, the Neel temperature of the CoPtCr alloy magnetic layer 44 is higher than that of a low Curie temperature material $PtMn_3$. Further, a protective film may be formed and a coating of lubricant may be applied on this film.

When this medium is used to record information, at least the recording region is heated to above the Neel temperature of the antiferromagnetic layer. At this time the recording layers above and below do not couple magnetically with each other, and the magnetization inversion units follow their activation magnetic moment or Barkhausen volume.

When for example a medium using a $Co_{64}Pt_{20}Cr_{16}$ magnetic film was measured at 495 K which is above the Neel point 473 K of the $Pt_{25}Mn_{75}$, a value of $0.064 \times 10^{-14}$ (emu) was obtained as the activation magnetic moment. When this medium was cooled down to the typical use temperature range of the apparatus, 300 K, under the influence of FeMn of the middle layer, the CoPtCrO layers above and below are affected to couple magnetically with each other. The activation magnetic moment had increased to $0.14 \times 10^{-14}$ (emu) when measured at this temperature.

Comparative Example 6

As comparative example 6, without forming an antiferromagnetic layer on a substrate, a magnetic recording medium was prepared in a same manner as in example 5 except for forming a twice as thick CoPtCrO magnetic layer to give almost the same Mrt on the undercoat film. The thermal fluctuation resistance index value vKu/tK of the magnetic layer of this medium at room temperature was almost the same as in the present invention, and the activation magnetic moment value was also equal, $0.08 \times 10^{-14}$ (emu).

The activation magnetic moment of this magnetic layer measured at 450 K had increased to $0.12 \times 10^{-14}$ (emu). Thus, activation magnetic moment during recording was smaller with the medium of example 5.

When recording was carried out with these media while heating with a laser, and reproduction signal was measured by a GMR head to determine So/Nm of the media, example 5 showed a higher value corresponding to the activation magnetic moment during recording. Furthermore, measurement of output reduction at room temperature showed almost equal values reflecting the thermal fluctuation resistance indexes.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A magnetic recording medium adapted for a magnetic recording/reproduction apparatus for recording while heating during recording the recording region to a determined recording temperature higher than the operating temperature of said magnetic recording/reproduction apparatus, comprising:
   a substrate,
   an optically impermeable under layer formed on the substrate, and
   a magnetic recording layer provided on the optically impermeable under layer and essentially consisting of a first magnetic material having a first Curie point higher than said recording temperature, and a second magnetic material having a second Curie point higher than said operation temperature and lower than said recording temperature.

2. A magnetic recording medium according to claim 1, wherein said magnetic recording layer having a structure wherein a first magnetic layer essentially consisting of said first magnetic material and a second magnetic layer essentially consisting of said second magnetic material are laminated one by one on a substrate.

3. A magnetic recording medium according to claim 2, being further provided with a third magnetic layer essentially consisting of said first magnetic material on said second magnetic layer.

4. A magnetic recording medium according to claim 1, wherein said magnetic recording layer having a structure wherein particles of a magnetic material essentially consisting of said first magnetic material are dotted in a matrix of a magnetic material essentially consisting of said second magnetic material.

5. A magnetic recording medium according to claim 1, wherein said magnetic recording layer having a structure wherein particles of a magnetic material essentially consisting of said first magnetic material form columns, and a magnetic body essentially consisting of said second magnetic material forms grain boundary of said columns.

6. A magnetic recording medium according to claim 1, wherein the optically impermeable under layer comprises at least one metal element selected from the group consisting of platinum, palladium, ruthenium, vanadium, and chromium.

7. A magnetic recording medium adapted for a magnetic recording/reproduction apparatus for recording while heating during recording the recording region to a determined recording temperature higher than the operating temperature of said magnetic recording/reproduction apparatus, comprising:

a substrate, an optically impermeable under layer provided on the substrate; and a magnetic recording layer provided on the optically impermeable under layer and essentially consisting of a ferromagnetic material having a Curie point higher than said recording temperature, and an antiferromagnetic material having a Neel temperature higher than said operation temperature and lower than said recording temperature.

8. A magnetic recording medium according to claim 7, wherein said magnetic recording layer having a structure wherein a ferromagnetic layer essentially consisting of said ferromagnetic material and an antiferromagnetic layer essentially consisting of said antiferromagnetic material are laminated one by one on the substrate.

9. A magnetic recording medium according to claim 8, being further provided with another ferromagnetic layer essentially consisting of said ferromagnetic material on said antiferromagnetic layer.

10. A magnetic recording medium according to claim 8, wherein said magnetic recording layer having a structure wherein particles of ferromagnetic material essentially consisting of said ferromagnetic material are dotted in a matrix of an antiferromagnetic material essentially consisting of said antiferromagnetic material.

11. A magnetic recording medium according to claim 8, characterized by said magnetic recording layer having a structure wherein particles of a magnetic material essentially consisting of said first magnetic material form columns, and a magnetic body essentially consisting of said second magnetic material forms grain boundary of said columns.

12. A magnetic recording medium according to claim 7, wherein said magnetic recording layer having a structure wherein particles of a ferromagnetic material essentially consisting of said ferromagnetic material form columns, and a magnetic body essentially consisting of said antiferromagnetic material forms gain boundary of said columns.

13. A magnetic recording medium according to claim 7, wherein the optically impermeable under layer comprises at least one metal element selected from the group consisting of platinum, palladium, ruthenium, vanadium, and chromium.

14. A magnetic recording/reproduction apparatus comprising;

a magnetic recording medium, driving means for holding and rotating said magnetic recording medium, a magnetic head device for carrying out recording of information on said magnetic recording medium, a device for reproducing recorded magnetic information, recording region heating means for heating the recording region of said magnetic recording medium to a determined recording temperature, and a carriage assembly for holding a magnetic recording head against said magnetic recording medium with freedom of movement, wherein said magnetic recording medium comprises a substrate, an optically impermeable under layer formed on the substrate, and a magnetic recording layer provided on the optically impermeable under layer and the magnetic recording layer essentially consists of a first magnetic material having a first Curie point higher than said recording temperature, and a second magnetic material having a second Curie point higher than said operation temperature and lower than said recording temperature.

15. A magnetic recording apparatus according to claim 14, wherein said magnetic recording layer having a structure wherein a first magnetic layer essentially consisting of said first magnetic material and a second magnetic layer essentially consisting of said second magnetic material are laminated one by one on a substrate.

16. A magnetic recording apparatus according to claim 15, being further provided with a third magnetic layer essentially consisting of said first magnetic material on said second magnetic layer.

17. A magnetic recording medium according to claim 14, wherein said magnetic recording layer having a structure wherein particles of magnetic material essentially consisting of said first magnetic material are dotted in a matrix of a magnetic material essentially consisting of said second magnetic material.

18. A magnetic recording apparatus according to claim 14, wherein the optically impermeable under layer comprises at least one metal element selected from the group consisting of platinum, palladium, ruthenium, vanadium, and chromium.

19. A magnetic recording/reproduction apparatus comprising:

a magnetic recording medium, driving means for holding and rotating said magnetic recording medium, a magnetic head device for carrying out recording of information on said magnetic recording medium, a device for reproducing recorded magnetic information, recording region heating means for heating the recording region of said magnetic recording medium to a determined recording temperature, and a carriage assembly for holding a magnetic recording head against said magnetic recording medium with freedom of movement, wherein said magnetic recording medium comprises a substrate, an optically impermeable under layer provided on the substrate and a magnetic recording layer provided on the optically impermeable under layer and essentially consisting of a ferromagnetic material and an antiferromagnetic material, the ferromagnetic material having a Curie point higher than said recording temperature, the antiferromagnetic material having a Neel temperature higher than said operation temperature of said recording/reproduction temperature and lower than said recording temperature.

20. A magnetic recording apparatus according to claim 19, wherein said magnetic recording layer having a structure wherein a ferromagnetic layer essentially consisting of said ferromagnetic material and an antiferromagnetic layer essentially consisting of said antiferromagnetic material are laminated one by one on the substrate.

21. A magnetic recording apparatus according to claim 20, being further provided with another ferromagnetic layer essentially consisting of said ferromagnetic material on said antiferromagnetic layer.

22. A magnetic recording apparatus according to claim 20, wherein said magnetic recording layer having a structure wherein particles of ferromagnetic material essentially consisting of said ferromagnetic material are dotted in a matrix of an antiferromagnetic material essentially consisting of said antiferromagnetic material.

23. A magnetic recording apparatus according to claim 19, wherein said magnetic recording layer having a structure wherein particles of a ferromagnetic material essentially consisting of said ferromagnetic material form columns, and a magnetic body essentially consisting of said antiferromagnetic material forms grain boundary of said columns.

24. A magnetic recording apparatus according to claim 19, wherein the optically impermeable under layer comprises at least one metal element selected from the group consisting of platinum, palladium, ruthenium, vanadium, and chromium.

* * * * *